United States Patent [19]

Murphy, Jr. et al.

[11] 4,064,752
[45] Dec. 27, 1977

[54] REMOTE MULTIPLE TANK LIQUID LEVEL MEASURING DEVICE

[75] Inventors: Frank W. Murphy, Jr., Bixby; Buddy G. Sparks, Tulsa, both of Okla.

[73] Assignee: Frank W. Murphy Manufacturer, Inc., Tulsa, Okla. ; a part interest

[21] Appl. No.: 734,658

[22] Filed: Oct. 21, 1976

[51] Int. Cl.² ............................................. G01F 23/14
[52] U.S. Cl. .................................................... 73/302
[58] Field of Search ........................ 73/302, 299, 290 R

[56] References Cited

U.S. PATENT DOCUMENTS

| | | | |
|---|---|---|---|
| 2,518,484 | 8/1950 | Matthews | 73/302 |
| 2,593,587 | 4/1952 | Marcus | 73/302 |
| 3,106,841 | 10/1963 | Brandel | 73/302 |
| 3,688,577 | 9/1972 | Murphy | 73/299 |

*Primary Examiner*—Charles A. Ruehl
*Assistant Examiner*—Denis E. Corr
*Attorney, Agent, or Firm*—D. Paul Weaver

[57] ABSTRACT

Liquid levels in remote underground bulk storage tanks are read and logged at a convenient location, such as in the office of a service station. A single liquid level gage within a sturdy tamper-proof housing is connected with a selector valve which communicates through tubes with the bottom portions of the remote underground tanks. Atmospheric air is pumped simultaneously to the bottom of a selected tank through said valve and to a bellows compression chamber of said gage.

1 Claim, 5 Drawing Figures

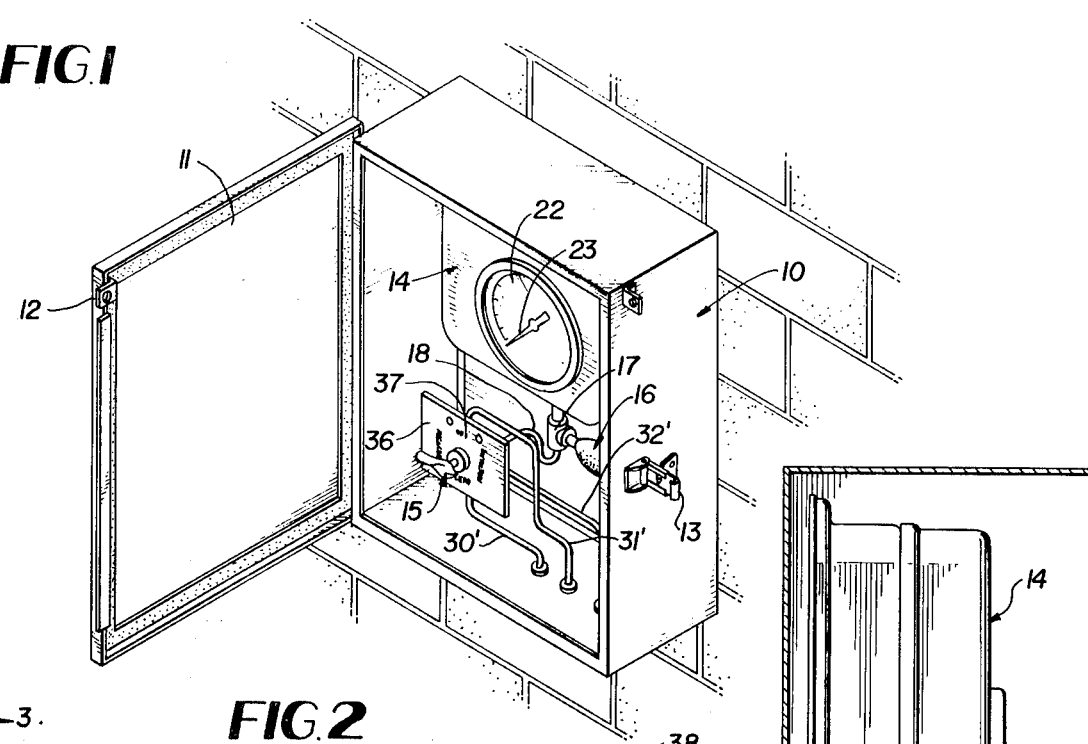
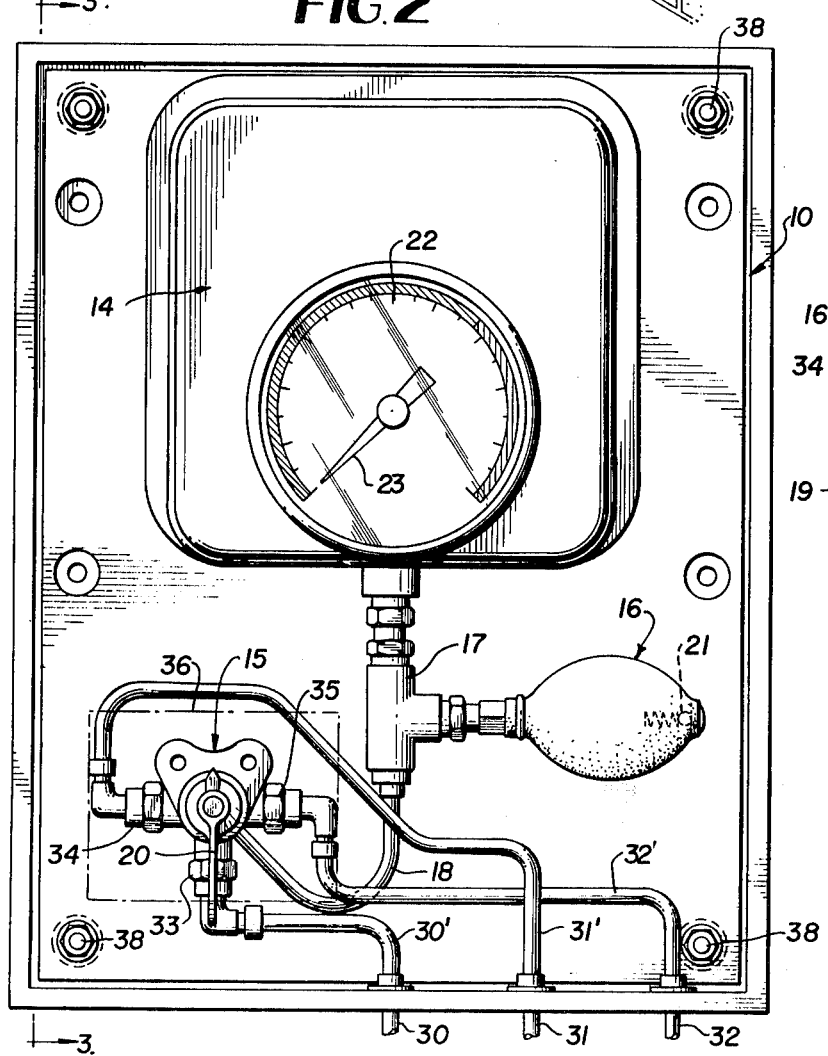

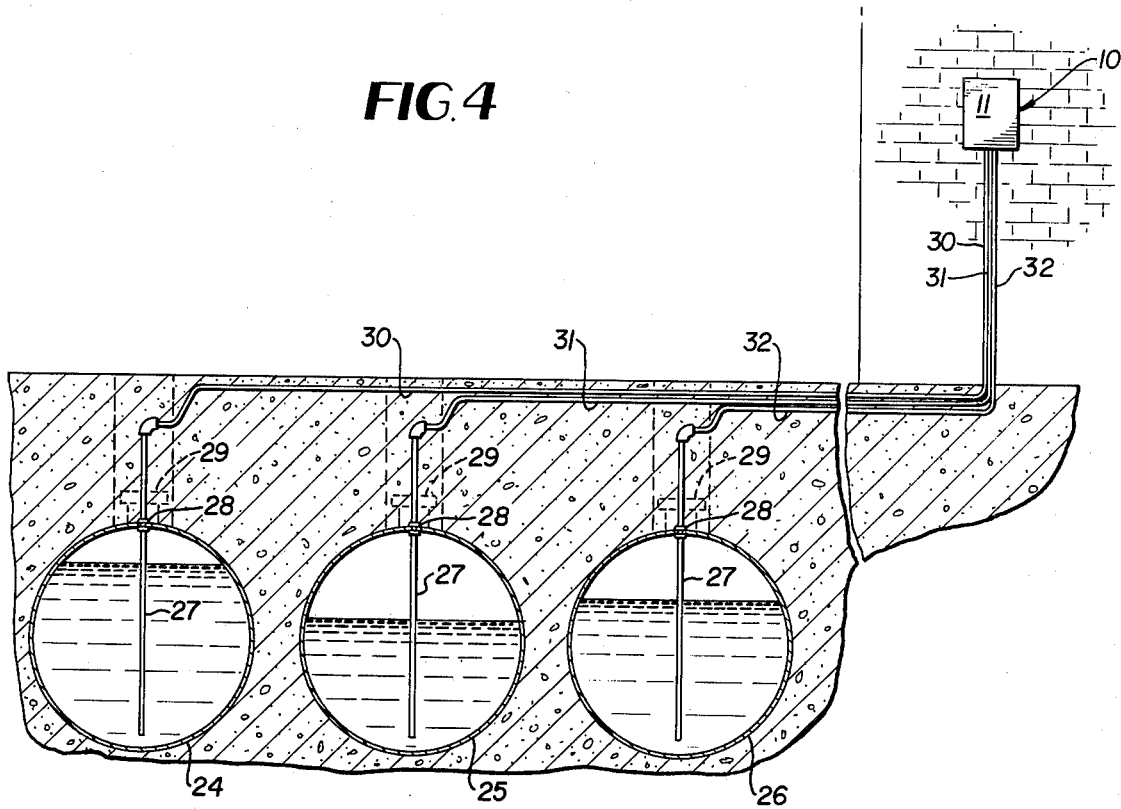
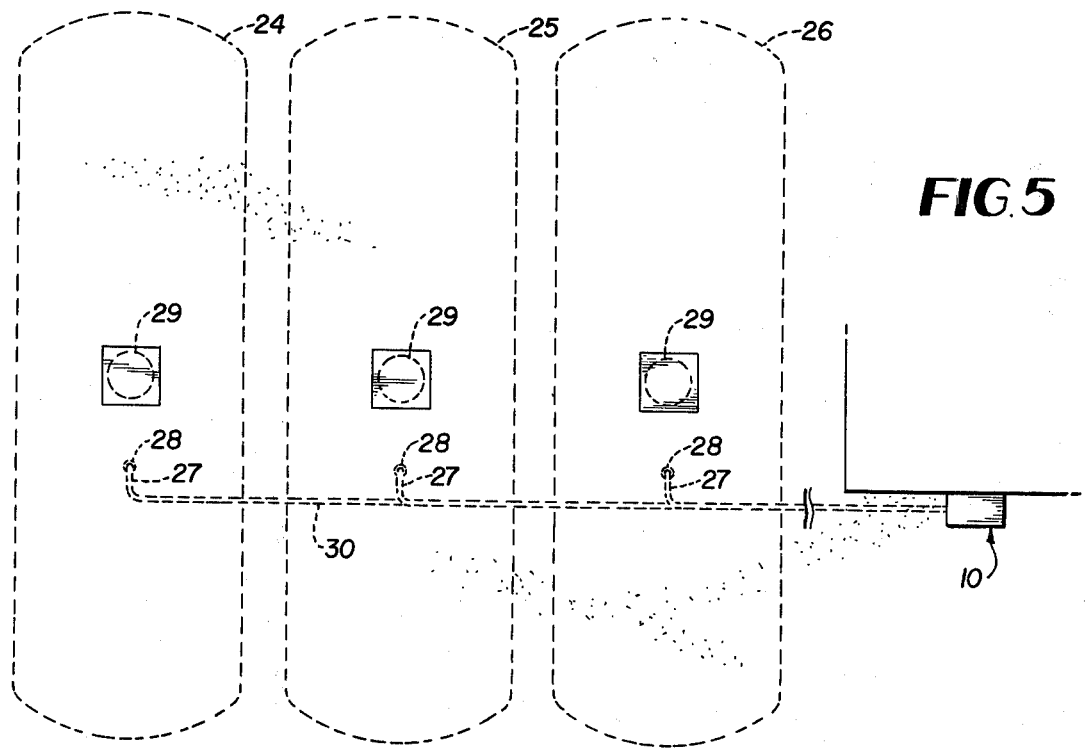

4,064,752

REMOTE MULTIPLE TANK LIQUID LEVEL MEASURING DEVICE

BACKGROUND OF THE INVENTION

A need exists for a safe and efficient liquid level measuring device for underground bulk storage tanks for gasoline in service stations and other like environments. Customarily, measurements are made with long measuring sticks to determine the liquid level in underground tanks before and/or after filling. Such traditional procedure requires removing the tank cover which creates a safety hazard due to the possible escape of fumes and requires the service station attendant or manager to leave his office post and to devote full time and attention to the tank filling operation and inventory procedure. All of this is costly, dangerous and inefficient.

The objective of the invention is to satisfy the above-stated need for a more efficient, reliable and safer means for selectively measuring with accuracy the liquid levels in a plurality of remote underground bulk storage tanks, by means of a single instrument and associated selector valve and manual pump mounted as a compact unit in the office of a service station or the like. The arrangement enables an attendant to accurately inventory the gasoline or other bulk liquids in multiple underground tanks without leaving the office with its attendant duties and without even exposing himself to the weather outside of the office. A simple multi-way selector valve communicating through tubes with plural underground tanks is coupled with a single liquid level measuring gage of the type disclosed in U.S. Pat. No. 3,688,577. The face of the measuring instrument is calibrated preferably in inches of liquid, so that a direct inventory of the liquid content of each of several remote underground tanks may be logged. The bellows of the single measuring instrument is pressurized with atmospheric air by operation of a simple elastic bulb pump equipped with a one-way check valve so that air can be drawn into the bulb and pumped to the instrument and the selected storage tank by the attendant until a proper pressure balance is reached. This condition will be known to the attendant when the instrument pointer falters. The liquid content in the particular tank in terms of liquid depth in inches or other linear measure may then be directly read.

An important advantage which the invention offers over conventional haphazard measuring practices is to reduce and eliminate the hazards of overfilling tanks with volatile products. The attendant can have a visual read-out at the instrument during the actual filling process in terms of "inches of the product" in the tank. Furthermore, the ability of the system to monitor up to three tanks which may be located as much as 75 feet away from the monitoring station is obviously a great advantage in terms of efficiency and economy.

Other features and advantages of the invention will become apparent during the course of the following detailed description.

BRIEF DESCRIPTION OF THE DRAWINGS

FIG. 1 is a perspective view of liquid level measuring means for multiple remote storage tanks embodying the invention.

FIG. 2 is a front elevational view of the measuring unit or device with the front cover removed.

FIG. 3 is a vertical cross section taken on line 3—3 of FIG. 2.

FIG. 4 is a partly schematic elevational view of the liquid level measuring device for multiple underground storage tanks.

FIG. 5 is a partly schematic plan view of the apparatus in FIG. 4.

DETAILED DESCRIPTION

Referring to the drawings in detail, the measuring device includes a sturdy instrument housing or box 10 preferably formed of steel and having a hinged gasketed front cover 11 which may be padlocked at 12 for security, in addition to the convenience latch 13. As shown, the housing 10 may be mounted on the wall of a service station office or the like. The tamper-proof housing 10 serves to house the tank liquid level gage 14 according to U.S. Pat. No. 3,688,577, a simple three-way selector valve 15 and an elastic pumping bulb 16 through which atmospheric air is delivered through a T-fitting 17 to the compression chamber, surrounding the bellows unit 56, as provided by the casing 48 in the aforementioned U.S. Pat. No. 3,688,577. The fitting simultaneously delivers air through a tubing loop 18 to an inlet fitting 19 of the conventional three-way selector valve 15 which has a rotary selector handle 20. The pumping bulb 16 contains a one-way check valve 21 which opens to admit atmospheric air and closes when the bulb is compressed to prevent the escape of air back to atmosphere.

The liquid level measuring gage 14 has a dial face 22 which is preferably graduated in inches, or other desired linear units, so that inches of the liquid product in a selected tank can be directly read and logged. The instrument pointer 23 sweeps the dial face 22 in response to bellows compression and expansion, as disclosed in the referenced prior patent.

Referring to FIGS. 4 and 5, remotely located underground storage tanks 24, 25 and 26 for gasoline or the like have vertical lengths 27 of one-quarter inch diameter steel tubing positioned therein fixedly by sealed coupling means 28. The conventional filling tank closures 29 are undisturbed by the invention. The lower ends of the tubing sections 27 extend to approximately 3 inches from the bottoms of the liquid storage tanks 24, 25 and 26. Near ground level, the tops of tubing sections 27 are connected with the measuring unit 10 by tubings 30, 31 and 32. These tubings are coupled with short tubing sections 30', 31' and 32' within the housing 10 and leading respectively to and coupled with fittings 33, 34 and 35 of the three-way selector valve 15.

The selector valve 15 has a face plate 36 fixed thereon which may be marked to indicate three operative positions of the selector handle 20 and an OFF position. As shown in FIG. 1, if the three tanks 24, 25 and 26 contain regular, no-lead, and premium gasoline, the three corresponding positions of the valve handle 20 are correspondingly marked on the face plate 36 and the OFF position is indicated as at 37. By merely turning the handle 20 to any of the three tank selector positions, any one of the tanks 24, 25 and 26 is placed in communication with the gage 14 through the three-way valve 15, while the other two tanks are sealed out of communication with the measuring gage.

In the use of the measuring device as above described, the attendant in the office of a service station or the like merely adjusts the valve handle 20 of selector valve 15 to place one of the storage tanks 24, 25 or 26 in communication with the liquid level measuring gage 14. At this time, the elastic bulb pump 16 is gently squeezed repeatedly to force atmospheric air into the bellows compression chamber of the instrument 14 and simultaneously into the bottom of the selected storage tank. The pumping action with the bulb 16 is continued until the gage needle 23 falters, indicating that the particular tubing section 27 is evacuated of the liquid therein by the pumping action and a balanced pressure condition has been reached between the head of liquid in the particular tank and the measurement then indicated by the gage 14, calibrated in inches but still being representative on a comparative basis of the pressure in a particular tank.

By repositioning the valve handle 20, the liquid content of each storage tank can be directly read on the face of the instrument 14, and a complete tank inventory can be obtained by the attendant in two or three minutes at a remote station and without opening the storage tanks or using the traditional dip stick. Safety and convenience are greatly enhanced and the arrangement with the invention is much more economical in the long run and well justifies the investment in the simple, rugged and comparatively inexpensive measuring means.

FIG. 2 of the drawings shows corner fastening means 38 by which the housing 10 may be securely mounted on any wall.

The advantages of the invention above-described should now be apparent to anyone skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A liquid level monitoring apparatus for plural remote underground storage tanks at an automobile service station comprising in combination a lockable steel security box for mounting on an interior wall of an automobile service station office, a pressure responsive measuring gage within the security box and having a dial calibrated in linear depth units of liquid product in said underground storage tanks, said gage being common to all of said tanks, a hand-operated rotary selector valve within the security box and having a rotary tank selector handle and a coacting indicia plate indicating tank selector positions for the handle, plural conduits connected with the rotary selector valve and anchored to and extending through a wall of the security box and terminating at locations near the bottoms of said underground tanks, the rotary selector valve having an inlet, a hand-operated elastic squeeze bulb having a one-way check valve and serving as an atmospheric air pump, said check valve closing when said squeeze bulb is compressed and opening during expansion of the squeeze bulb to admit atmospheric air, a conduit interconnecting said rotary selector valve inlet with said pressure responsive gage, a T-coupling in the last-named conduit and connected with the elastic squeeze bulb, whereby atmospheric air can be pumped simultaneously to the gage and selector valve inlet, said rotary selector valve being operable to place one underground tank at a time in fluid communication with said gage through one of said first-named conduits while blocking fluid communication between the other tanks and said gage.

* * * * *